United States Patent
Hsu et al.

(10) Patent No.: US 10,264,396 B2
(45) Date of Patent: Apr. 16, 2019

(54) METHOD OF DISTANCE MEASUREMENT BETWEEN WIRELESS COMMUNICATION DEVICES IN WIRELESS COMMUNICATION SYSTEM

(71) Applicant: MEDIATEK INC., Hsin-Chu (TW)

(72) Inventors: Tsai-Yuan Hsu, Hsinchu County (TW); Po-Jung Chiu, Tainan (TW); Shun-Yong Huang, Hsinchu (TW)

(73) Assignee: MediaTek Inc., Hsin-Chu (TW)

( * ) Notice: Subject to any disclaimer, the term of this patent is extended or adjusted under 35 U.S.C. 154(b) by 197 days.

(21) Appl. No.: 14/597,231

(22) Filed: Jan. 15, 2015

(65) Prior Publication Data
US 2016/0209495 A1 Jul. 21, 2016

(51) Int. Cl.
H04W 4/02 (2018.01)
G01S 11/06 (2006.01)
G01S 13/74 (2006.01)

(52) U.S. Cl.
CPC ............. *H04W 4/023* (2013.01); *G01S 11/06* (2013.01); *G01S 13/74* (2013.01)

(58) Field of Classification Search
CPC ....... H04W 4/043; H04W 64/00; G01S 5/021; G01S 5/02
See application file for complete search history.

(56) References Cited

U.S. PATENT DOCUMENTS

| | | | | |
|---|---|---|---|---|
| 9,213,082 B2 * | 12/2015 | Aggarwal | ............. | G01S 5/0205 |
| 2007/0217379 A1 * | 9/2007 | Fujiwara | ............... | G01S 5/0205 370/338 |
| 2009/0011713 A1 | 1/2009 | Abusubaih | | |
| 2009/0066931 A1 * | 3/2009 | Kang | ..................... | G01S 17/105 356/5.08 |
| 2010/0135178 A1 * | 6/2010 | Aggarwal | ............. | G01S 5/0205 370/252 |
| 2011/0044199 A1 * | 2/2011 | Kazmi | ................ | H04L 43/0864 370/252 |
| 2011/0065453 A1 * | 3/2011 | Baldemair | ............ | G01S 5/0009 455/456.1 |
| 2011/0170430 A1 * | 7/2011 | Yang | ....................... | G01D 21/00 370/252 |
| 2011/0221632 A1 | 9/2011 | Fretenburg | | |
| 2013/0121173 A1 * | 5/2013 | Chen | ..................... | H04W 24/08 370/252 |
| 2013/0143590 A1 * | 6/2013 | Sridhara | ................. | G01S 5/021 455/456.1 |
| 2013/0285753 A1 | 10/2013 | Lin | | |
| 2013/0344815 A1 | 12/2013 | Cahill | | |
| 2014/0274111 A1 * | 9/2014 | Edge | ..................... | H04W 4/023 455/456.1 |
| 2014/0274119 A1 * | 9/2014 | Venkatraman | ........ | H04W 4/043 455/456.1 |
| 2015/0131460 A1 * | 5/2015 | Sridhara | ............... | H04W 48/20 370/252 |

* cited by examiner

*Primary Examiner* — Melanie Jagannathan
(74) *Attorney, Agent, or Firm* — Wolf, Greenfield & Sacks, P.C.

(57) ABSTRACT

A method of distance measurement for a first wireless communication device of a wireless communication system includes receiving a frame from a second wireless communication device of the wireless communications system; determining a signal strength of the received frame; and obtaining a round trip time (RTT) and estimating a distance between the first wireless communication device and the second wireless communication device according to the signal strength of the received frame.

4 Claims, 3 Drawing Sheets

METHOD OF DISTANCE MEASUREMENT BETWEEN WIRELESS COMMUNICATION DEVICES IN WIRELESS COMMUNICATION SYSTEM

BACKGROUND

The present invention relates to a method of distance measurement between wireless communication devices in a wireless communication system, and more particularly, to a method combining distance measurement derived from received signal strength indication (RSSI) and measurement of round trip time (RTT) to estimate a distance between wireless communication devices in a wireless communication system.

In IEEE 802.11 standard, TOD (Time of Departure) and TOA (Time of Arrival) both are timing parameters utilized for signal transmission to represent a period at which a packet is transmitted from a transmitting antenna and a period at which a packet is received by a receiving antenna, respectively. Accordingly, via recording the TOD and TOA corresponding to a delivered signal, a transmission period (e.g. a round trip time) can be adaptively obtained to derive a transmission distance between two stations or wireless communication devices.

However, before a timing measurement handshake is processed between the two wireless communication devices, each wireless communication device is necessary to apply a calibration flow to compensate a digital latency or an analogy circuit delay, so as to obtain an accurate distance between two wireless communication devices. Specifically, the available calibration flow may utilize a pre-stored look-up table in each wireless communication device. Nevertheless, the look-up table may consume a lot of memory space due to different vendor requirements or sensitivity temperature of circuits. Alternatively, applying calibration loops to the receiver/transmitter is practicable, but more hardware costs may be anticipated and a serious synchronization issue for the receiver/transmitter is inevitable.

Therefore, it has become an important issue to provide another efficient method for distance measurement between two wireless communication devices to avoid the utilization of a look-up table or calibration loops for the wireless communication system.

SUMMARY

Therefore, the primary objective of the present invention is to provide a method of distance measurement between wireless communication devices in a wireless communication system.

The present invention discloses a method of distance measurement for a first wireless communication device of a wireless communication system. The method includes receiving a frame from a second wireless communication device of the wireless communications system; determining a signal strength of the received frame; and obtaining a round trip time (RTT) and estimating a distance between the first wireless communication device and the second wireless communication device according to the signal strength of the received frame.

The present invention further discloses a wireless communication system comprising a first wireless communication device and a second wireless communication device. The first wireless communication device comprises a processing unit, for executing a program code; and a data storage unit, for storing the program code; wherein the program code instructs the processing unit to execute the following steps: receiving a frame from a second wireless communication device of the wireless communications system; determining a signal strength of the received frame; and obtaining a round trip time (RTT) and estimating a distance between the first wireless communication device and the second wireless communication device according to the signal strength of the received frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
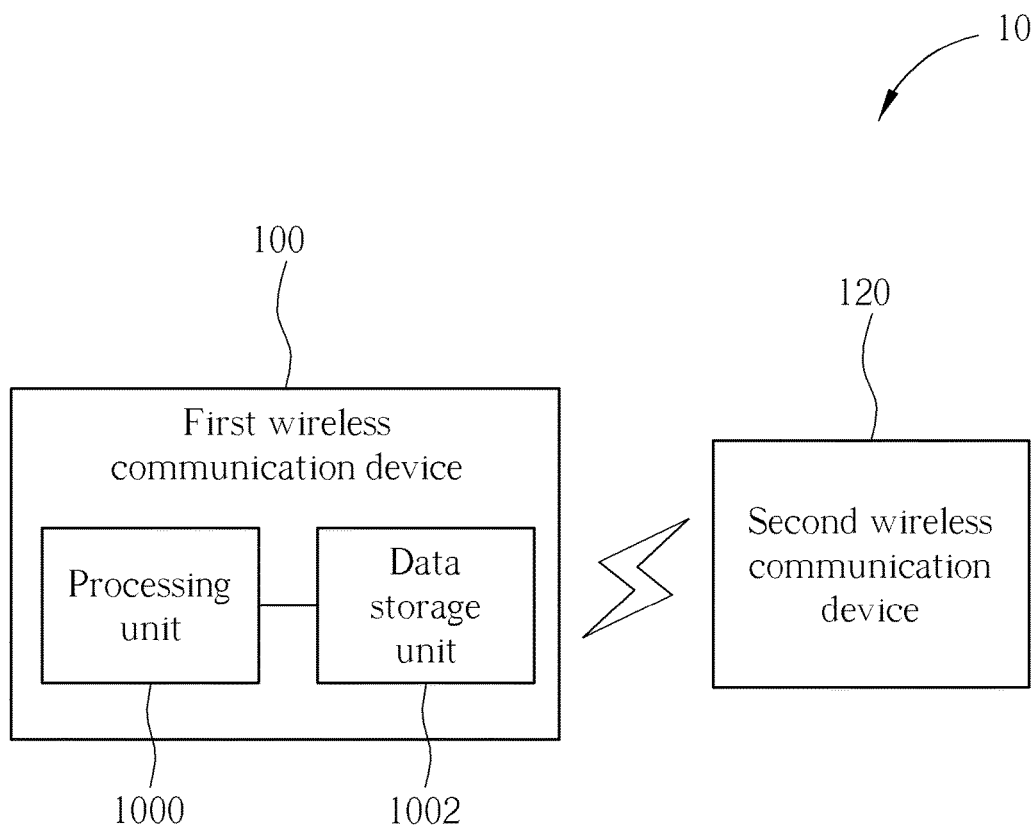
FIG. 1 illustrates a schematic diagram of a wireless communication system according to an embodiment of the invention.
Figure 2:
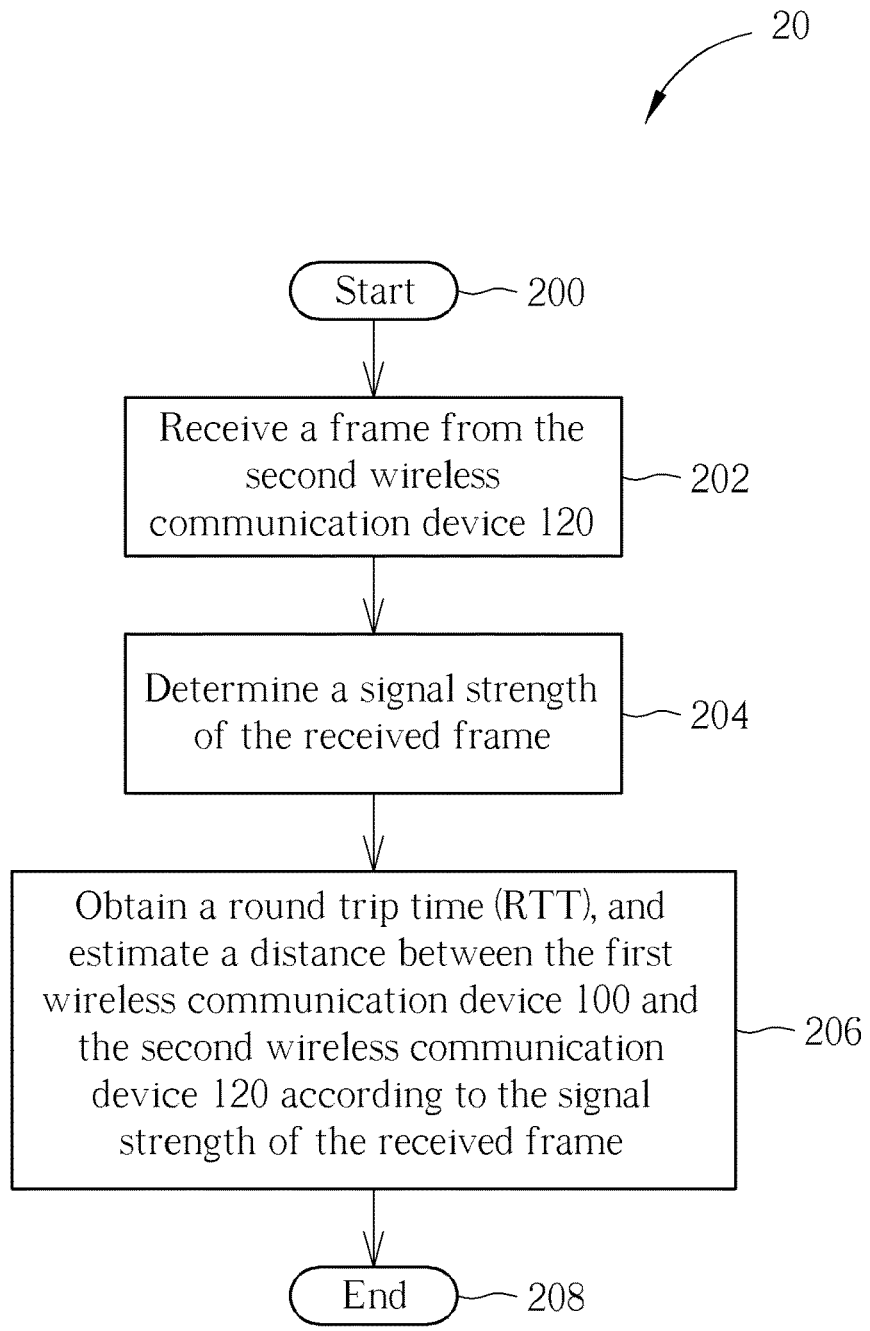
FIG. 2 illustrates a flowchart diagram for the first wireless communication device of the invention to process the method of distance measurement according to an embodiment of the invention.
Figure 3:
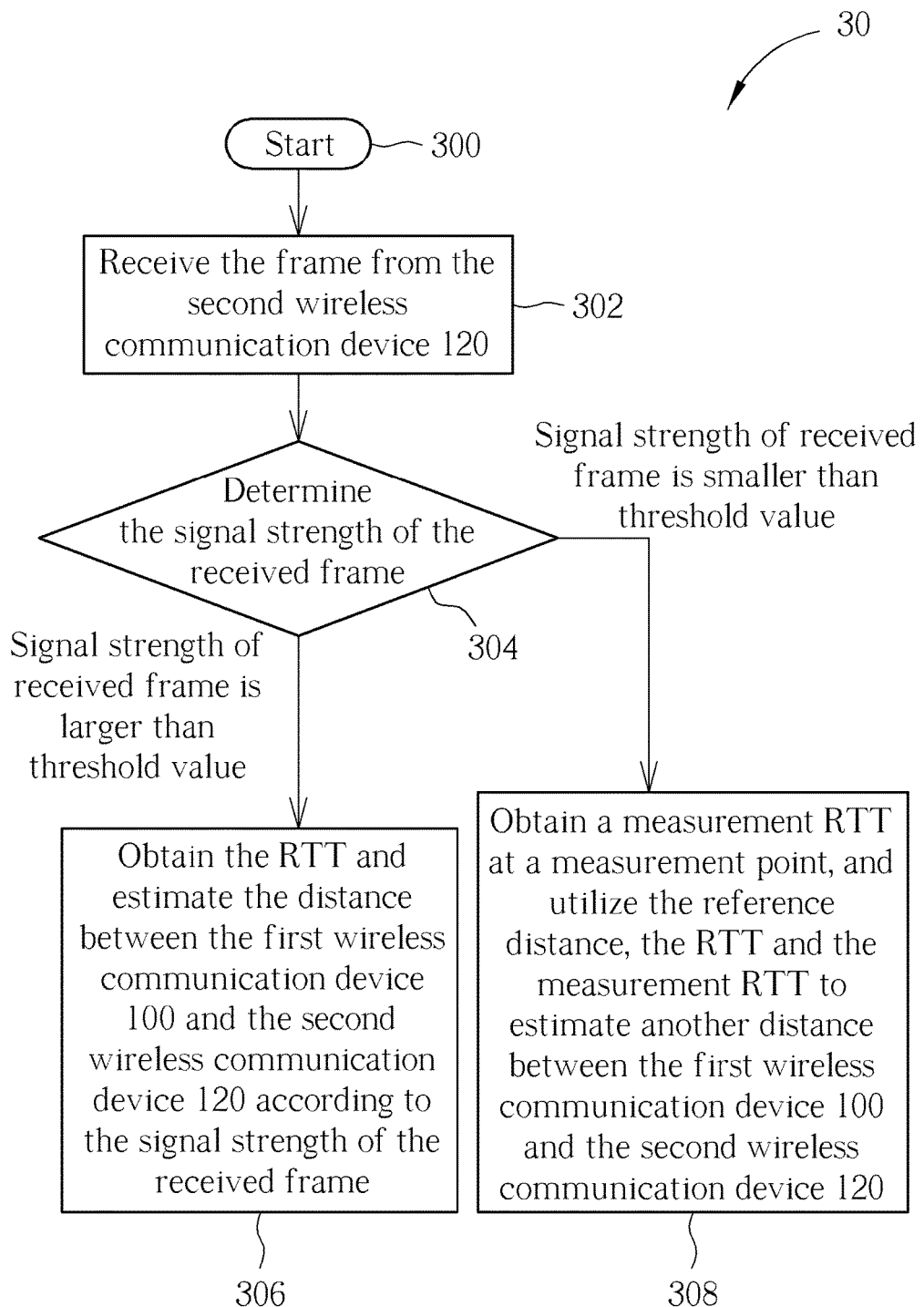
FIG. 3 illustrates another flowchart diagram for the first wireless communication device of the invention to process another method of distance measurement according to an embodiment of the invention.

Please refer to FIG. 3, which illustrates a schematic diagram of a wireless communication system 10 according to an embodiment of the invention. The wireless communication system 10 may comply with the IEEE 802.11 standard, and comprises a first wireless communication device 100 and a second wireless communication device 120. Specifically, the first wireless communication device 100 comprises at least a processing unit 1000 and a data storage unit 1002. The data storage unit 1002 stores a program code to instruct the processing unit 1000 for performing a distance measurement method to calculate a distance to another wireless communication device in the wireless communication system 10, such as the second wireless communication device 120. Also, the embodiment of the invention is not restricted to the realization of the first wireless communication device 100 or related composition elements/units thereof, and so is the second wireless communication device 120. For example, the first wireless communication device 100 of the invention may be an access point (AP) and the second wireless communication device 120 may be a mobile device, such that a wireless transmission operation between the first wireless communication device 100 and the second wireless communication device 120 may be performed. While operating the distance measurement of the first wireless communication device 100, the second wireless communication device 120 may also at least comprise a processing unit and a data storage unit to simultaneously process another distance measurement method, which is also in the scope of the invention.

Please refer to FIG. 4, which illustrates a flowchart diagram for the first wireless communication device 100 of the invention to process the method of distance measurement according to an embodiment of the invention. The method of distance measurement can be summarized as a process 20 to be stored as the program code in the data storage unit 1002 of the first wireless communication device 100, and the process 20 of the invention comprises the following steps:

Step 200: Start.

Step 202: Receive a frame from the second wireless communication device 120.

Step 204: Determine a signal strength of the received frame.

Step 206: Obtain a round trip time (RTT), and estimate a distance between the first wireless communication device 100 and the second wireless communication device 120 according to the signal strength of the received frame.

Step 208: End.

According to the process 20, the first wireless communication device 100 may have initiated the time measurement handshake with the second wireless communication device 120 being ready for transmitting frames to (or receiving frames from) the second wireless communication device 120.

In step 202, via a wireless transmission operation complying with the IEEE 802.11 standard, the frame comprising communication information is transmitted from the second wireless communication device 120 to the first wireless communication device 100. Specifically, the frame of the embodiment may be a timing measurement frame to initiate the distance measurement of the first wireless communication device 100.

In step 204, the first wireless communication device 100 determines the signal strength of the received frame. Specifically, the first wireless communication device 100 of the embodiment has the received signal strength indication (RSSI) associated with the received frame from the second wireless communication device 120. In an embodiment, the second wireless communication device 120 may also transmit the frame including a transmitter power level to inform the first wireless communication device 100 of an original signal strength of the transmitted frame. After receiving the frame by the first wireless communication device 100 accompanying a signal decaying effect due to no transmission in the vacuum, the signal strength of the received frame is smaller than the original signal strength of the transmitted frame.

In step 206, the first wireless communication device 100 obtains the RTT in view of the time measurement handshake with the second wireless communication device 120, and estimates the distance between the first wireless communication device 100 and the second wireless communication device 120 according to the signal strength of the received frame. Specifically, referring to an initial period of the time measurement handshake and another receipt period of the received frame, the RRT can be calculated in the first wireless communication device 100. Besides, the first wireless communication device 100 may compare the original signal strength of the transmitted frame with the signal strength of the received frame, to derive the distance between the first wireless communication device 100 and the second wireless communication device 120 in view of some estimation models related to the path loss of RSSI versus distance, which is well known to those skilled in the art to be neglected herein for brevity.

Accordingly, the process 20 of the invention determines the distance between the first wireless communication device 100 and the second wireless communication device 120 via the RSSI, which is experimented to have an accurate calculation, especially in a short distance. In addition, the process 20 of the invention also calculates and the RTT thereof for further operations to be presented in the following paragraphs.

Noticeably, in the process 20 of the invention, the first wireless communication device 100 may further compare the signal strength of the received frame with a threshold value, which may be a predetermined signal strength indicating a maximum value of the RSSI to be ever measured by the first wireless communication device 100. If the current signal strength of the received frame is larger than the threshold value, the estimated distance in step 206 will be stored as a reference distance. Once the reference distance is obtained at a reference point, the RTT thereof is regarded as a reference RTT to be compared with other RTTs.

In other words, while processing the process 20, the reference distance and RTT of the embodiment may be dynamically updated to record/refresh the distance, corresponding to another larger RSSI compared to the threshold value, between the first wireless communication device 100 and the second wireless communication device 120, and accordingly, the threshold value will also be simultaneously updated once the refreshed reference distance is determined.

Further, please refer to FIG. 3, which illustrates another flowchart diagram for the first wireless communication device 100 of the invention to process another method of distance measurement according to an embodiment of the invention. The method of distance measurement can be summarized as a process 30 to be stored as the program code in the data storage unit 1002, and the process 30 of the invention comprises the following steps:

Step 300: Start.

Step 302: Receive the frame from the second wireless communication device 120.

Step 304: Determine the signal strength of the received frame. If the signal strength of the received frame is larger than the threshold value, process step 306. Otherwise, process step 308.

Step 306: Obtain the RTT and estimate the distance between the first wireless communication device 100 and the second wireless communication device 120 according to the signal strength of the received frame.

Step 308: Obtain a measurement RTT at a measurement point, and utilize the reference distance, the RTT and the measurement RTT to estimate another distance between the first wireless communication device 100 and the second wireless communication device 120.

In the process 30 of the invention, step 302 is identical to the step 202 of the process 20. In step 304, the first wireless communication device 100 determines the signal strength of the received frame, and further compares the signal strength of the received frame to a threshold value. If the signal strength of the received frame is larger than the threshold value, operations in step 306 will be processed with the refresh/updating of the threshold value and the reference distance, wherein step 306 is almost identical to step 206 of the process 20 to be neglected herein for brevity. Alternatively, if the signal strength of the received frame is smaller than the threshold value, operations in step 308 will be processed.

In step 308, the first wireless communication device 100 also obtains a measurement RTT at a measurement point in view of the initial period of the time measurement handshake with the second wireless communication device 120 and the receipt period of the received frame, wherein the measurement point is different from the reference point as another measurement point where the signal strength of the received frame (i.e. RSSI) is smaller than the threshold value at the reference point. Further, the first wireless communication device 100 utilizes the reference distance, the RTT (i.e. obtaining at the reference point) and the measurement RTT to estimate another distance between the first wireless communication device 100 and the second wireless communication device 120. In detail, the first wireless communication device 100 sequentially processes the operations of obtaining a difference between the RTT and the measurement RTT, generating a production of the difference and a light velocity (i.e. the light speed in the air), and adding the reference distance to a half of the production to obtain the distance between the first wireless communication device 100 and the second wireless communication device 120, which can be demonstrated in the formula as: distance=reference distance+("measurement RRTT"−"RTT")*C/2, wherein C represents the light speed in the air.

In other words, the process 30 of the invention introduces another approach to obtain the distance between the first wireless communication device 100 and the second wireless communication device 120 via the combination of the operation of deriving the reference distance from the RSSI, as disclosed in the process 20 of the invention, and the measurement of two RTTs at a reference point and another measurement point. Specifically, the process 30 inherits the advantage of the better accurate calculation in the short distance from the process 20, and integrates the straightforward calculation from comparing the difference between the RTT at the reference point and the measurement RTT at another measurement point, which has the smaller RSSI than the threshold value. In such a situation, deriving the distance at the measurement point from the RSSI is difficult and unreliable because the signal strength of the received frame at the measurement point might significantly decay with a larger transmission path in comparison with threshold value measure at the reference distance, and alternatively, the measurement of the RTT or the measurement RTT may be effortless and the absolute value of RTT/measurement RTT may be linearly proportional to the distance from the reference point to the measurement point. Due to the advantage of being averagely consistent with a small variance in a fixed range, it may be a good reason to directly calculate the distance between the reference point and the measurement point after the reference distance is obtained. Thus, once the reference distance is accurately calculated on the basis of the process 20, the operation of obtaining the RTT and the measurement RTT seems more practicable for those skilled in the art to assist the distance measurement with fewer burdens and higher efficiency.

Accordingly, the instant application provides the hybrid solution combining the operation of deriving the reference distance from the RSSI (so called the RSSI-to-distance operation) and the comparison of two RTTs, to estimate the distance between the first wireless communication device 100 and the second wireless communication device 120, which is not necessary to compensate the digital latency as well as the analogy circuit delay in each wireless communication device as the prior art. Also, if the signal strength of the received frame (i.e. RSSI) in the first wireless communication device 100 is larger enough for measuring, the distance between the two wireless communication devices may be accurately estimated from the RSSI-to-distance operation. In addition, as shown in the process 30 of the invention, the measurement of two RTTS at the reference point and at another measurement point may provide the efficient solution with less variances/errors to estimate the distance between the two wireless communication devices.

Noticeably, the distance measurement method of the invention may be applied to all kinds of wireless communication devices, and the estimated distance of the invention may assist other operations of the wireless communication device with broader application. For example, the signal strength of the transmitted frame may adaptively adjusted or the transmission antennas may also be selected/adjusted after the generation of the estimated distance. Certainly, the estimation models related to the path loss of RSSI versus distance of the invention may be adaptively determined according to different transmission environments, which is not limited the scope of the invention.

In summary, the embodiment of the invention provides the method of distance measurement between any two wireless communication devices. According to different RSSIs of the received signals, the estimation is generated in two approaches, i.e. one is obtained via measuring the RSSI of the received signal, and the other further combines the measurement of two RTTS at the reference point and one measurement point. In comparison with the prior art, there is no need to consider the compensation of digital latency or analogy circuit delay, which contributes fewer hardware costs with more storage spaces to be conserved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of distance measurement for a first wireless communication device of a wireless communication system, the method comprising:
    receiving a frame from a second wireless communication device of the wireless communications system, the frame including a transmitter power level indicating a transmission strength of the frame;
    determining a signal strength of the received frame;
    estimating a distance between the first wireless communication device and the second wireless communication device based on the signal strength of the received frame and the transmitter power level;
    storing the distance as a reference distance;
    obtaining a first measurement round trip time (RTT) associated with the distance, wherein the distance is a first distance;
    obtaining a second measurement RTT when the first and second wireless communication devices are separated by a second distance greater than the first distance; and
    utilizing the reference distance, the first measurement RTT and the second measurement RTT to estimate the second distance, the utilizing the reference distance, the first measurement RTT and the second measurement RTT to estimate the second distance comprising:
        obtaining a difference between the first measurement RTT and the second measurement RTT; and
        adding the reference distance to a half of a product of the difference and a light velocity, to estimate the second distance.

2. The method of claim 1, wherein the distance is stored as a reference distance when the signal strength of the received frame is larger than a threshold value.

3. A first wireless communication device comprising:
    a processor for executing a program code; and
    data storage for storing the program code;

wherein the program code, when executed by the processor, instructs the processor to execute the following steps:

receiving a frame from a second wireless communication device, the frame including a transmitter power level indicating a transmission strength of the frame;

determining a signal strength of the received frame;

estimating a distance between the first wireless communication device and the second wireless communication device based on the signal strength of the received frame and the transmitter power level;

storing the distance as a reference distance;

obtaining a first measurement round trip time (RTT) associated with the distance, wherein the distance is a first distance;

obtaining a second measurement RTT when the first and second wireless communication devices are separated by a second distance greater than the first distance; and utilizing the reference distance, the first measurement RTT and the second measurement RTT to estimate the second distance, wherein the step of utilizing the reference distance, the first measurement RTT and the second measurement RTT to estimate the second distance comprises:

obtaining a difference between the first measurement RTT and the second measurement RTT; and adding the reference distance to a half of a product of the difference and a light velocity, to estimate the second distance.

4. The first wireless communication device of claim 3, wherein the distance is stored as a reference distance when the signal strength of the received frame is larger than a threshold value.

* * * * *